1

3,130,197
PRODUCTION OF AZAMONOMETHINECYANINES OF THE BENZOTHIAZOLE SERIES
Matthias Seefelder, Ludwigshafen (Rhine), and Hans Gerhard Reppe, Frankenthal, Pfalz, Germany, assignors to Badische Anilin- & Soda-Fabrik Aktiengesellschaft, Ludwigshafen (Rhine), Germany
No Drawing. Filed July 11, 1962, Ser. No. 209,210
Claims priority, application Germany July 14, 1961
5 Claims. (Cl. 260—305)

This invention relates to a new process for the production of azamonomethinecyanines of the benzothiazole series of the general formula:

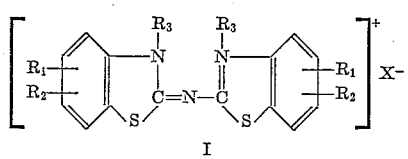

in which $R_1$ and $R_2$ are hydrogen, halogen, alkyl or alkoxy groups with 1 to 12, preferably with up to 4 carbon atoms, $R_3$ are low molecular weight alkyl groups with up to 12, preferably up to 4, carbon atoms, and in which $X^-$ is the equivalent of an acid radical.

The production of azamonomethinecyanines (I) from 2-alkylmercaptobenzothiazolium salts and salts of 2-iminobenzothiazolines is described in British Patent No. 447,038. This process has the disadvantage that two different starting materials are employed and the process must be carried out in the presence of an acid-binding agent such as pyridine. Moreover, troublesome mercaptans are produced in the reaction which cannot be utilized and must therefore be destroyed in a special plant. Another process for the production of azamonomethinecyanines from 2-alkylmercaptobenzothiazolium salts is described in British Patent No. 461,668. In this process, too, acid-binding agents have to be employed while mercaptans are also formed as undesired by-products.

It is an object of this invention to produce azamonomethinecyanines of the Formula I by a process which is superior technically to prior art methods. A further object of the invention is to provide a process in which large quantities of undesired and troublesome by-products are not formed.

We have found that azamonomethinecyanines of the benzothiazole series of the general Formula I can be produced in an economical way and in excellent yield by reacting 2-iminobenzothiazolines of the general formula:

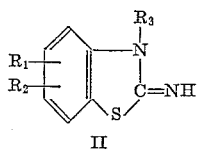

in which $R_1$, $R_2$ and $R_3$ have the meanings given above, with strong, preferably anhydrous, acids, in the presence or absence of an organic solvent or diluent, at temperatures between 100 and 250° C., preferably between 130 and 200° C.

In the general Formula II for the starting materials and also in the general Formula I, $R_1$ and $R_2$ are substituents in the benzene ring which may be in the ortho, meta or para positions to one another. $R_1$ and $R_2$ may be hydrogen, halogen such as fluorine, chlorine and bromine, low molecular weight branched and linear alkyl groups with 1 to 12, preferably 1 to 4, carbon atoms, such as the methyl, ethyl, propyl, isopropyl, butyl, tert. butyl, amyl and dodecyl groups and branched and linear alkoxy groups with 1 to 12, preferably 1 to 4, carbon atoms such as the methoxy, ethoxy, propoxy, isopropoxy, butoxy, amyloxy and dodecyloxy groups. $R_3$ which represents a branched or linear alkyl group with 1 to 12, preferably 1 to 4, carbon atoms may, for example, be methyl, ethyl, propyl, isopropyl, butyl, tert. butyl, amyl and dodecyl.

Suitable 2-iminobenzothiazolines (II) are, for example, 3-methyl-2-iminobenzothiazoline,
3-ethyl-2-iminobenzothiazoline,
3-butyl-2-iminobenzothiazoline,
3,6-dimethyl-3-iminobenzothiazoline,
3-methyl-6-tert. butyl-2-iminobenzothiazoline,
3-methyl-6-methoxy-2-iminobenzothiazoline,
3-ethyl-6-butoxy-2-iminobenzothiazoline,
3-methyl-5-chloro-2-iminobenzothiazoline,
3,6-dimethyl-4-chloro-2-iminobenzothiazoline and
3,6-dimethyl-4-methoxy-2-iminobenzothiazoline.

In the preparation of the azamonomethinecyanines (I) the 2-iminobenzothiazolines (II) are advantageously treated with an organic solvent or diluent, preferably high-boiling, such as xylene, tetrahydronaphthalene, chlorobenzene, o-dichlorobenzene, glycol dibutyl ether or N-methylpyrrolidone and heated with at least a stoichiometric proportion of a strong, preferably anhydrous, inorganic or organic, mono- or polybasic acid, such as hydrogen chloride, hydrogen bromide, sulfuric acid, phosphoric acid, an alkylsulfuric acid up to $C_4$, benzenesulfonic acid, naphthalenesulfonic acid, p-toluenesulfonic acid, methansulfonic acid, ethanesulfonic acid and butanesulfonic acid, at a temperature between 100 and 250° C., preferably between 130 and 200° C. The rate of reaction depends on the reaction temperature and on the nature of the reactants. In general, the reaction is practically complete after approximately 10 minutes to 2 hours. An excess of acid is not harmful but it is preferable to employ the acid in a stoichiometric proportion. The nature of the acid radical $X^-$ in Formula I is determined by the acid employed. In the case of monobasic acids $X^-$ is the anion of the acid while in the case of polybasic acids $X^-$ is the equivalent of the anion.

When low boiling solvents or diluents are employed it may be necessary to operate under pressure in order to achieve the desired reaction temperature.

The azamonomethinecyanines (I) usually crystallize out from the reaction product on cooling. The solvent is separated off, advantageously by filtration, and the residue is dried in vacuo. In general, it is unnecessary to purify the product further.

The azamonomethinecyanines of the benzothiazole series (I) obtained according to the invention conveniently and in high yield are brightening agents for such articles as film, fibers, flock, threads, filaments, felts, woven and knitted fabrics of cotton, cellulose hydrate, cellulose ethers, cellulose esters, synthetic polyamides or acrylonitrile polymers. The azamonomethinecyanines described also find use as sensitizers in photography.

The process according to the invention is not intended to be limited to the examples below. These examples are essentially set forth to illustrate the principle and practice of this invention. All parts are by weight.

*Example 1*

190 parts p-toluenesulfonic acid monohydrate and 1000 parts o-dichlorobenzene are mixed, the water is distilled off and 328 parts 3-methyl-2-iminobenzothiazoline added. The mixture is then boiled under reflux for 30 minutes. The precipitate formed on cooling is separated off and dried. 470 parts, i.e., 97% of the theory, of the azamonomethinecyanine of the following formula, M.P. 275 to 280° C., is obtained.

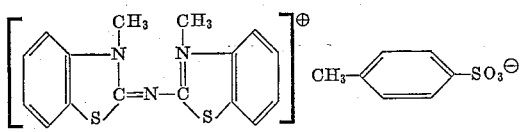

Example 2

172 parts p-toluenesulfonic acid, 750 parts o-dichlorobenzene and 388 parts 3-methyl-6-methoxy-2-iminobenzothiazoline are heated under reflux with stirring and boiled for 30 minutes. The reaction mixture is cooled and the precipitate separated off and dried. 495 parts, i.e., 91% of the theory, of the azamonomethinecyanine of the following formula, M.P. 285 to 290° C., is obtained.

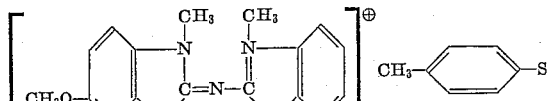

Example 3

356 parts 3,6-dimethyl-2-iminobenzothiazoline, 172 parts p-toluenesulfonic acid and 800 parts o-dichlorobenzene are heated to boiling with stirring and refluxed for 30 minutes. The reaction mixture is cooled, the precipitate filtered off and dried. 470 parts, i.e., 92% of the theory, of the azamonomethinecyanine of the following formula, M.P. 235 to 240° C., is obtained.

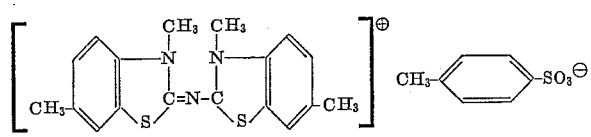

We claim:
1. A process for the production of a compound of the Formula I:

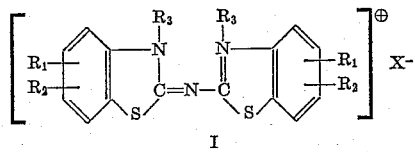

in which $R_1$ and $R_2$ are members selected from the group consisting of hydrogen, halogen, linear and branched alkyl of 1 to 12 carbon atoms and linear and branched alkoxy of 1 to 12 carbon atoms, $R_3$ represents linear and branched alkyl of 1 to 12 carbon atoms, and $X^-$ is the equivalent of an anion of a strong acid, which comprises reacting 2-iminobenzothiazolines of the Formula II

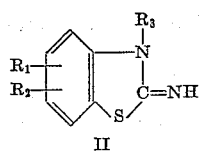

in which $R_1$, $R_2$ and $R_3$ have the above meanings, with a strong acid at temperatures between 100 and 250° C.

2. A process for the production of a compound of the Formula I:

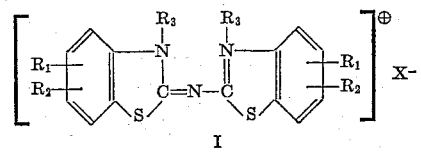

in which $R_1$ and $R_2$ are members selected from the group consisting of hydrogen, halogen, linear and branched alkyl of 1 to 12 carbon atoms and linear and branched alkoxy of 1 to 12 carbon atoms, $R_3$ represents linear and branched alkyl of 1 to 12 carbon atoms, and $X^-$ is the equivalent of an anion of a strong acid, which comprises reacting 2-iminobenzothiazolines of the Formula II

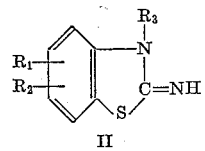

in which $R_1$, $R_2$ and $R_3$ have the above meanings, in an organic liquid having a boiling point above the reaction temperature with a strong acid at temperatures between 100 and 250° C.

3. A process for the production of a compound of the Formula I:

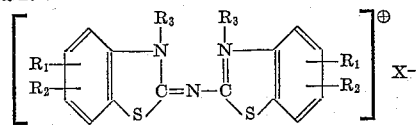

in which $R_1$ and $R_2$ are members selected from the group consisting of hydrogen, halogen, linear and branched alkyl of 1 to 4 carbon atoms and linear and branched alkoxy of 1 to 4 carbon atoms, $R_3$ represents linear and branched alkyl of 1 to 4 carbon atoms, and $X^-$ is the equivalent of an anion of a strong acid, which comprises reacting 2-iminobenzothiazolines of the Formula II:

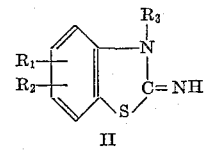

in which $R_1$, $R_2$ and $R_3$ have the above meanings with a strong acid HX in a high-boiling organic liquid at temperatures between 130° and 200° C.

4. A process as claimed in claim 1 for the production of the compound of the formula:

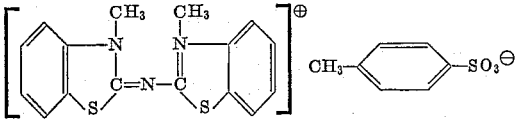

and in which the strong acid is p-toluenesulfonic acid.

5. A process for the production of a compound of the Formula I

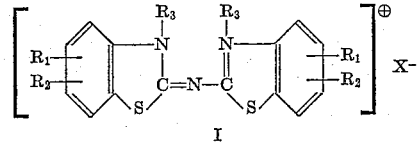

in which $R_1$ and $R_2$ are members selected from the group consisting of hydrogen, halogen, linear and branched alkyl of 1 to 12 carbon atoms and linear and branched alkoxy of 1 to 12 carbon atoms, $R_3$ represents linear and branched alkyl of 1 to 12 carbon atoms, and $X^-$ is the equivalent of an anion of a strong acid selected from the group consisting of hydrogen chloride, hydrogen bromide, sulfuric acid, phosphoric acid, alkylsulfuric acids with 1 to 4 carbon atoms, benzenesulfonic acid, naphthalenesulfonic acid, p-toluenesulfonic acid, methanesulfonic acid, ethanesulfonic acid and butanesulfonic acid, which comprises reacting 2-iminobenzothiazolines of the Formula II

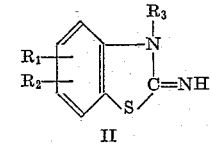

in which $R_1$, $R_2$ and $R_3$ have the above meanings, with a strong acid at temperatures between 100 and 250° C.

No references cited.